Sept. 22, 1925.  1,554,744
P. MACK
MOTOR DRIVEN LAWN MOWER
Filed March 23, 1923    3 Sheets-Sheet 3
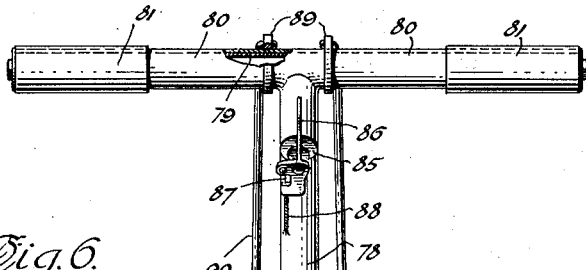
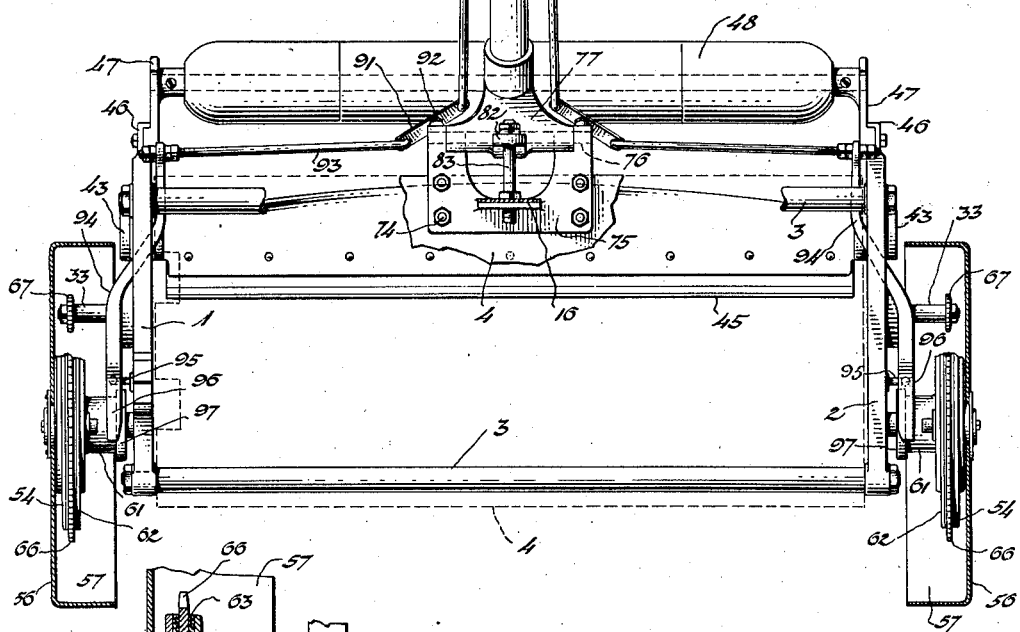

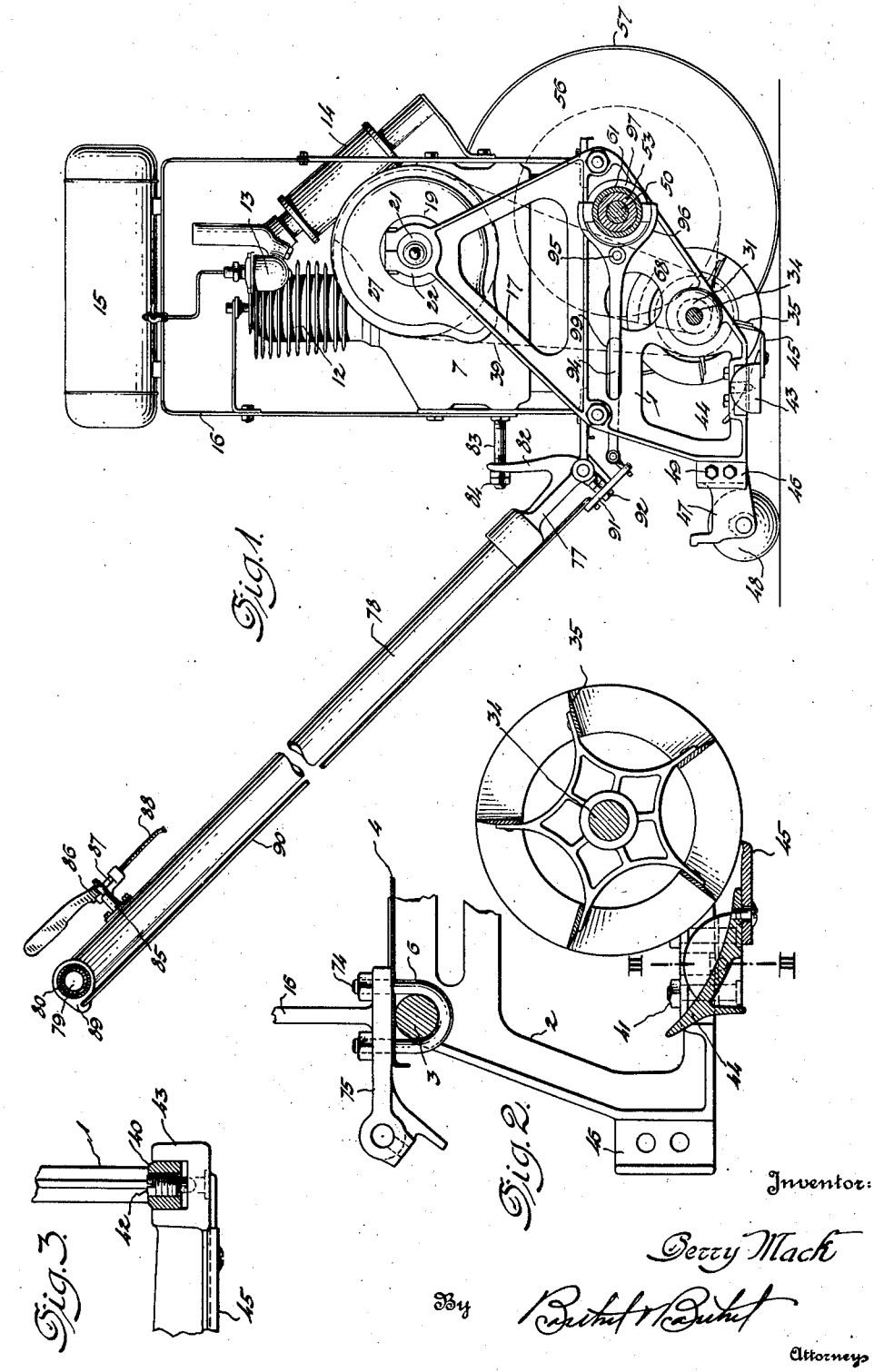

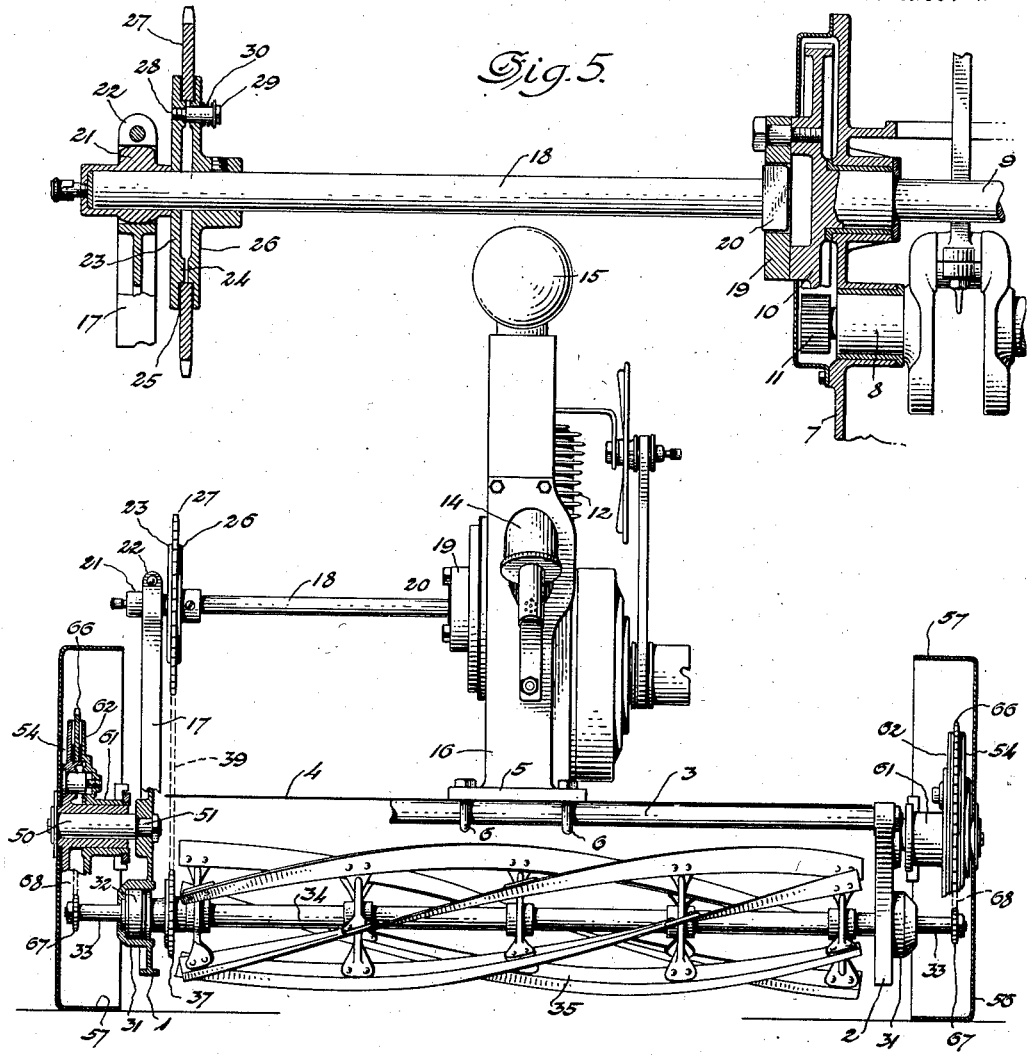

Patented Sept. 22, 1925.

1,554,744

UNITED STATES PATENT OFFICE.

PERRY MACK, OF MILWAUKEE, WISCONSIN, ASSIGNOR TO MOTO-MOWER COMPANY, OF DETROIT, MICHIGAN, A CORPORATION OF MICHIGAN.

MOTOR-DRIVEN LAWN MOWER.

Application filed March 23, 1923. Serial No. 627,056.

*To all whom it may concern:*

Be it known that I, PERRY MACK, a citizen of the United States of America, residing at Milwaukee, in the county of Milwaukee and State of Wisconsin, have invented certain new and useful Improvements in Motor-Driven Lawn Mowers, of which the following is a specification, reference being had therein to the accompanying drawings.

This invention relates to motor driven lawn mowers and has special reference to that general type which are adapted to be guided and controlled by an operator walking behind the lawn mower, the traction and cutting operations being performed by a motor or prime mover balanced on the machine. A power lawn mower in accordance with my invention may be characterized in the following particulars.

First, I have produced a durable, lightweight and flexible machine capable of cutting a wide swath and the general design of the machine is such that it may be raised out of ruts, pushed over slippery surfaces, or otherwise manipulated in situations where power operation is impractical or impossible.

Second, my power lawn mower includes a knife or cutter reel and traction ground engaging wheels, both power driven and arranged so that either or both may be automatically disconnected from the source of power, to prevent driving mechanisms or other parts of the lawn mower from being broken or injured, particularly when the knife or cutter reel encounters an obstruction. In some types of power lawn mowers this result is attained through the medium of gears, cone clutches or the like, but in contradistinction to such mechanical devices I employ a friction drive and a friction control. The friction drive will permit of the knife or cutter reel automatically disengaging itself relative to the motor or prime mover when the knives or cutters of the mower encounters sticks, stones or other indurate obstacles, and the friction control of the machine permits of the power being disconnected relative to the traction or ground engaging wheels to facilitate guiding the lawn mower. The friction control of the machine permits of a certain amount of slippage at either ground engaging wheel making it perfectly easy and practical to turn to the right or left without in any manner altering the relative position of the ground engaging wheels, and it is by virtue of the friction drive and friction control in connection with my lawn mower that the same can be expeditiously operated, is practically "fool proof" and can be at all times kept in an operatable condition at a minimum expense.

Third, my power lawn mower is further characterized by a handle bar control which permits of the operator of the lawn mower controlling the application of power to the traction or ground engaging wheels of the lawn mower, and provision is made for controlling the power plant contiguous to the handle bars, and placing the handle bars in a desired position for the convenience of the operator.

Fourth, my power lawn mower is further characterized by easy access being had to the friction control and friction drive devices so that adjustments can be made to compensate for lost motion and wear.

The above are a few of the main features of my invention and others will appear as the power lawn mower is described by aid of the drawings, wherein Figure 1 is a side elevation of the lawn mower with the handle bar thereof partly broken away;

Fig. 2 is an enlarged cross sectional view of a portion of the lawn mower showing the rotary cutter reel and stationary knife;

Fig. 3 is a detail sectional view taken on the line III—III of Fig. 2;

Fig. 4 is a front elevation of part of the lawn mower, partly broken away and partly in section;

Fig. 5 is an enlarged detail sectional view illustrating a jack shaft and a friction drive;

Fig. 6 is a plan of the lawn mower partly broken away and partly in horizontal section, and Fig. 7 is an enlarged horizontal sectional view of a portion of one of the traction or ground engaging wheels showing the friction control.

The power lawn mower comprises side frames 1 and 2 connected by tie rods 3 and mounted on said tie rods is a substantially horizontal platform or cover 4. Intermediate the frames 1 and 2 and supported on the platform 4 and the rods 3 is a base 5 of a power plant which may be fixed relative to the rods 3 by nut equipped U-bolts 6 or other fastening means. The power plant may be of a conventional form, preferably an internal combustion engine 7 including a crank shaft 8, a drive shaft 9 driven by gears 10 and 11 from the crank shaft 8, a cylinder 12, a carburetor 13, an exhaust and muffler 14, and a fuel supply tank 15 supported by a frame 16 over the engine. This briefly outlines a rugged easily controlled power plant that may include other devices and accessories forming no part of the present invention.

The side frame 1 has an extension in the form of a bearing 17 for a jack shaft 18 longitudinally alining with the drive shaft 9 and driven therefrom. Suitably secured to the gear wheel 10 of the drive shaft 9 is a socket member 19 for the head 20 of the jack shaft 18, said head and socket constituting a universal joint or coupling between said shafts establishing a driving relation from the drive shaft 9 to the jack shaft, yet permitting of the outer end of the jack shaft being adjusted to compensate for any lost motion or wear in power transmission mechanism to be hereinafter referred to.

In the upper end of the bearing 17 is an eccentric journal box 21 for the outer end of the jack shaft 18 and this eccentric journal box may be adjusted in the bearing and fixed by clamping members 22 of said bearing. Lose on the jack shaft 18, at the eccentric journal box 21, is a disk friction member 23 provided with an annular shoulder 24 and a friction ring 25, said ring being mounted on the shoulder 24 and preferably made of fiber.

Fixed on the jack shaft 18 and confronting the disk friction member 23 is a complemental friction member 26 having a shoulder and ring similar to the member 23. Loosely mounted on the shoulders 24 between the friction rings 25 is a sprocket chain wheel 27 adapted to be driven by friction from the jack shaft 18. To establish the driving relation between the friction members 23, 26 and the wheel 27, yet permit of a certain amount of slippage should occasion require, the friction member 23 is provided with studs 28 extending through openings provided therefor in the friction member 26, said studs having adjustable heads or caps 29 for increasing or decreasing the expansive force of springs 30 about the studs, and it is the expansive force of these springs that causes the friction member 23 to be constantly drawn towards the friction member 26 to clamp the wheel 27 between said friction members for driving purposes.

The side frames 1 and 2 are provided with exterior housings 31 for anti-friction roller bearings 32 which include dust guards etc. and journaled in said bearings are the spindles 33 of a cutter shaft 34, said cutter shaft supporting a conventional form of spiral knife cutter or reel 35. On the ends of the cutter shaft 34, at the inner sides of the housings 31 are fixed hubs 36 for sprocket wheels 37 which may be held by jamb nuts 38 screwed or otherwise mounted on the ends of the cutter shaft. The sprocket wheels 37 are in the same planes as the sprocket wheels 27 and about the sprocket wheels 37 and 27 are trained endless sprocket chains 39 which together with the sprocket wheels constitute a power transmission mechanism from the engine or jack shaft to the rotary cutter.

The lower rails of the frames 1 and 2 are provided with enlargements 40 for nut equipped bolts 41 and screws 42. The nut equipped bolts 41 are adapted for supporting the channel ends 43 of a transverse curved support 44 for a stationary detachable cutter blade 45 which cooperate with the rotary cutter in severing blades of grass or other plants. The nut equipped bolts 41 permit of the support 44 and the blade 45 being raised towards the rotary cutter and the screws 42 permit of the support and its blade being moved away from the rotary cutter and in this respect cooperate with the nut equipped bolts in holding the stationary blade 45 relative to the rotary cutter.

On the rear edges of the frames 1 and 2 are apertured channel shaped ears 46 for the end bearings 47 of a roller 48, said end bearings being connected to the ears 46 by nut equipped bolts 49. The end bearings 47 may cooperate with other parts of the lawn mower, particularly a handle bar or tongue, in supporting a bag or receptacle to receive cut grass.

The frames 1 and 2, at the forward ends thereof and contiguous to the top rails of said frames are provided with axles 50 having eccentric threaded shanks 51 extending through the frames 1 and 2 and provided with nuts 52 which permit of the axles 50 being turned about the axes of the shanks 51 to provide a take-up adjustment for power transmission mechanisms to be hereinafter described.

Rotatable on the axles 50 are traction or ground engaging wheels and as these wheels are identical in construction, I deem it only necessary to describe one of said wheels with special reference to Figs. 4 and 7.

Each wheel includes a hub 53 provided with a disk friction member 54 having a friction ring 55 made of fiber or other suitable material. Mounted on the hub 53 against the friction member 54 is the body or web 56 of a hollow or cup shaped wheel 57 having a hub flange 58 retained in engagement with the hub 53 by a cap 59 attached to the axle 50 by screw bolts 60 or other fastening means. This form of connection permits of the wheel 57 being easily removed so that easy access may be had to the friction member 54 and adjacent parts.

Slidable on the hub 53 is a sleeve 61 provided with a disk friction member 62 having a friction ring 63. The friction member 62 has an annular groove 64 to receive an annular flange 65 of a friction member 54 and loose on said flange between the friction rings 55 and 63 is a sprocket wheel 66 adapted to be clamped between the friction members to establish a driving relation between the wheel 57 and the sprocket wheel 66. This sprocket wheel 66 is in the same vertical plane as a small sprocket wheel 67 mounted on the spindle 33 of the cutter shaft 34 and an endless sprocket chain 68 is trained over said sprocket wheels to cooperate therewith in providing a power transmission mechanism between the rotary cutter and the ground engaging wheel.

The friction members 54 and 62 are connected by a plurality of tension devices, each comprising a cup 69 carried by the friction member 54 and extending into a recess 70 of the friction member 62. In the cup 69 is a screw bolt 71 extending through said cup and adjustably supported in a boss 72 of the friction member 62. A coiled expansion spring 73 encircles the screw 71 in the cup 69 and by adjusting the screw 71 the expansive force of the spring may be increased or decreased and thus regulate the tension device.

Mounted on the platform or cover 4 at its rear edge and attached to the rearmost tie rod 3 by nut equipped U-bolts 74 is a base plate 75 to which is pivotally connected by a pin 76 or other pivotal means, the socket or head 77 of a tubular handle bar or tongue 78 having a cross member 79 provided with handle sleeve 80 and hand grips 81. The socket or head 77 has an upstanding apertured arm 82 engaged by a rearwardly extending nut equipped bolt 83 supported from the frame 16 and by adjusting the nuts 84 on the bolt 83 the handle bar or tongue 78 may be placed at a desired angle relative to the platform or cover 4 for the convenience of the operator.

On the handle bar or tongue 78, adjacent the cross member 79, is a control device for the power plant, said device comprising a support 85 for a pivoted bell crank 86 having a rod 87 extending through a flexible member 88 leading to the power plant for controlling a throttle, valve or other power control device (not shown).

The handle sleeves 80 are rotatable on the cross members 79 and the inner ends of said sleeves have crank portions 89 connected by rods 90 to arms 91 pivotally connected, as at 92 to the ends of the base plate 75. The arms 91 are connected by rods or links 93 to the rear ends of offset levers 94 extending through openings 99 provided therefor in the frames 1 and 2. The outer ends of the levers 94 are pivotally mounted on bearings 95 carried by the outer walls of the frames 1 and 2 and the ends of said levers terminate in forks 96 engaging end abutments or nuts 97 mounted on the inner ends of the sleeves 61. By partially rotating the handle sleeves 80 by the handles 81 the rods 90 and 93, arms 91 and levers 94 may be actuated to retract or shift the sleeve 61, against the action of the springs 73, to reduce the friction between the sprocket wheels 66 and friction rings 63 and 55, or temporarily render such friction drive completely inactive for the purpose intended.

Assuming that the power plant has been placed in operation and that the jack shaft 18 is being driven, the frictionally held sprocket wheel 27 on the outer end of the jack shaft constitutes a safety clutch or device which prevents any damage to the machine should any obstruction get into the cutting reel. The sprocket wheel 27 is simply held by the spring tension devices of the friction members 23 and 26 and should any obstacle be picked up the friction rings 25 will slip and continue to do so until the machine is stopped and the obstruction removed. As pointed out in the beginning the tension devices are adjustable, but they are properly set in the beginning, at the factory, and it is seldom or never found necessary to change the devices.

Since there may be lost motion or wear in connection with the chain 69 the jack shaft 18 has been made adjustable, particularly at the journal box 21, to compensate for such lost motion and wear, and for the same reason the axles 50 of the wheels 57 have been mounted for adjustment in order that the sprocket chains 68 may be maintained taut or approximately so.

I desire to direct attention to Fig. 1 and the fact the the axis of the ground engaging wheels is above and in advance of the axis of the rotary cutter and that the axles 50 serve as pivots for the side frames 1 and 2. If the rotary cutter encounters an obstruction said cutter may swing upwardly and to a certain extent prevent injury to the cutter before the safety friction device of the jack shaft is brought into action. Since the lawn mower is power driven it is only necessary for the operator to guide the lawn mower and by virtue of the friction devices in the wheel 57, either wheel or both may stand still while the engine and cutting reel continue to operate. Then again, the power to each wheel may be instantly reduced or disconnected, permitting the operator to turn readily to the right or left as desired, thus making the machine especially adaptable in trimming close to walks, shrubbery and border outlines of a lawn.

I attach considerable importance to the friction "dry plate" devices embodied in the wheels and radically different from cone clutches or the like, and while in the drawings there is illustrated a preferred embodiment of my invention, it is to be understood that the structural elements are susceptible to such variations and modifications as fall within the scope of the appended claims.

What I claim is:—

1. A lawn mower comprising a power driven cutter, ground wheels, a friction drive device for each ground wheel, each friction drive device including a chain wheel sandwiched between friction members, one of which is movable relative to the other.

2. A lawn mower comprising ground engaging wheels, a cutter, a chain and sprocket wheel drive from said cutter to said ground wheels, a power plant, a chain and sprocket wheel drive from said power plant to said cutter, and individual friction clutches associated with each cutter drive and each ground wheel drive of which the sprocket wheels form intermediate members.

3. A lawn mower comprising ground engaging wheels, a cutter, a chain sprocket wheel drive from said cutter to said ground wheels, a power plant, a chain sprocket wheel drive from said power plant to said cutter, said cutter chain and sprocket wheel drive including a jack shaft adjustable to compensate for wear of said chain and wheel, and a friction clutch associated with each drive of which the sprocket wheels form intermediate members.

4. A lawn mower comprising ground wheels, side frames, adjustable axles in said side frames supported from said ground wheels, a cutter between said side frames, a power plant supported from said side frames, power transmission means from said power plant to said cutter and from said cutter to said ground wheels, and friction devices located in the transmission means of said cutter and in the transmission means of said ground wheels.

5. A lawn mower as called for in claim 4, wherein said power transmission means includes a jack shaft parallel to the axis of said cutter with one end of said jack shaft adjustable to take up lost motion.

6. A lawn mower as called for in claim 4, and a handle bar for said lawn mower with means of independently controlling the friction devices in said ground wheels.

7. In a power lawn mower, side frames, a cover supported from said side frames, a handle bar projecting rearwardly from said cover and having an angular adjustment relative thereto, ground wheels adjustable relative to said side frames, a rotary cutter supported by said side frames in the rear of the axis of said ground wheels so that any upward movement of said handle bar tends to lift said cutter away from the ground, and a power plant adapted for driving said cutter.

8. A power lawn mower as called for in claim 7, and means adapted to transmit power from said cutter to either or both ground wheels.

9. In a power lawn mower wherein ground wheels movably support a rotary cutter, a power plant for operating said cutter, and a handle bar:—means for transmitting power to each ground wheel from each end of said cutter, said means including frictionally engaged wheels, and means carried by said handle bar for varying the frictional engagement with said wheels.

10. A power lawn mower as called for in claim 9, wherein the last mentioned means includes oscillatory handles, rods, levers and friction members.

11. In a power lawn mower, ground wheels adapted to be driven and each comprising a body, a hub, a stationary friction member in said body, a movable friction member supported from said hub, a driven wheel sandwiched between said friction members, and means adapted for moving said movable friction member.

12. A power mower as called for in claim 11, wherein said driven wheel is supported on a flange of said wheel body and said movable friction member has a groove therein to receive the flange of said wheel body.

13. A power lawn mower as called for in claim 11, and a plurality of tension devices connecting said stationary and movable friction members to clamp said driven wheel therebetween.

14. A ground wheel for a power lawn mower, comprising a wheel body, a shaft extending into said wheel body for driving said wheel, a chain and two sprocket wheel drive in said wheel body operated from said shaft for driving said wheel, and means frictionally supporting one of said sprocket wheels.

15. In a power lawn mower wherein ground wheels support side frames and are driven by sprocket chains:—means for maintaining said chains taut, said means comprising ground wheel axles having an eccentric adjustment relative to said side frames from which said axles are supported.

16. A ground engaging wheel for a power lawn mower, comprising a hub, a friction member carried thereby, a friction member slidably supported on said hub, a driven wheel sandwiched between said friction members, adjustable tension devices connecting said friction members, and a wheel body connected to the hub friction member and removable so that said tension devices may be adjusted.

17. A ground engaging wheel as called for in claim 16, wherein said tension devices normally clamp said driven wheel between said friction members, and means engaging said slidably friction member adapted to release the tension of said tension devices.

18. In a power driven lawn mower, wherein ground wheels and a roller movably support a cutter and power plant with the power plant adapted to drive the ground wheels and cutter, and wherein a handle bar permits of said lawn mower being guided:— means for controlling the application of power to said ground wheels, said means including an adjustable friction device concentric of the axis of each ground wheel, and independent control mechanism extending from the central portion of each wheel to the upper end of said handle bar.

In testimony whereof I affix my signature.

PERRY MACK.